INVENTORS.
CHARLES F. ALEXANDER, JR.
DANIEL F. McCORMICK
BY
Andrus & Starke
Attorneys Sept. 3, 1968   C. F. ALEXANDER, JR., ET AL   3,399,647
ACTUATING MEANS FOR MARINE CLUTCH
Original Filed Jan. 7, 1964                                      4 Sheets-Sheet 4

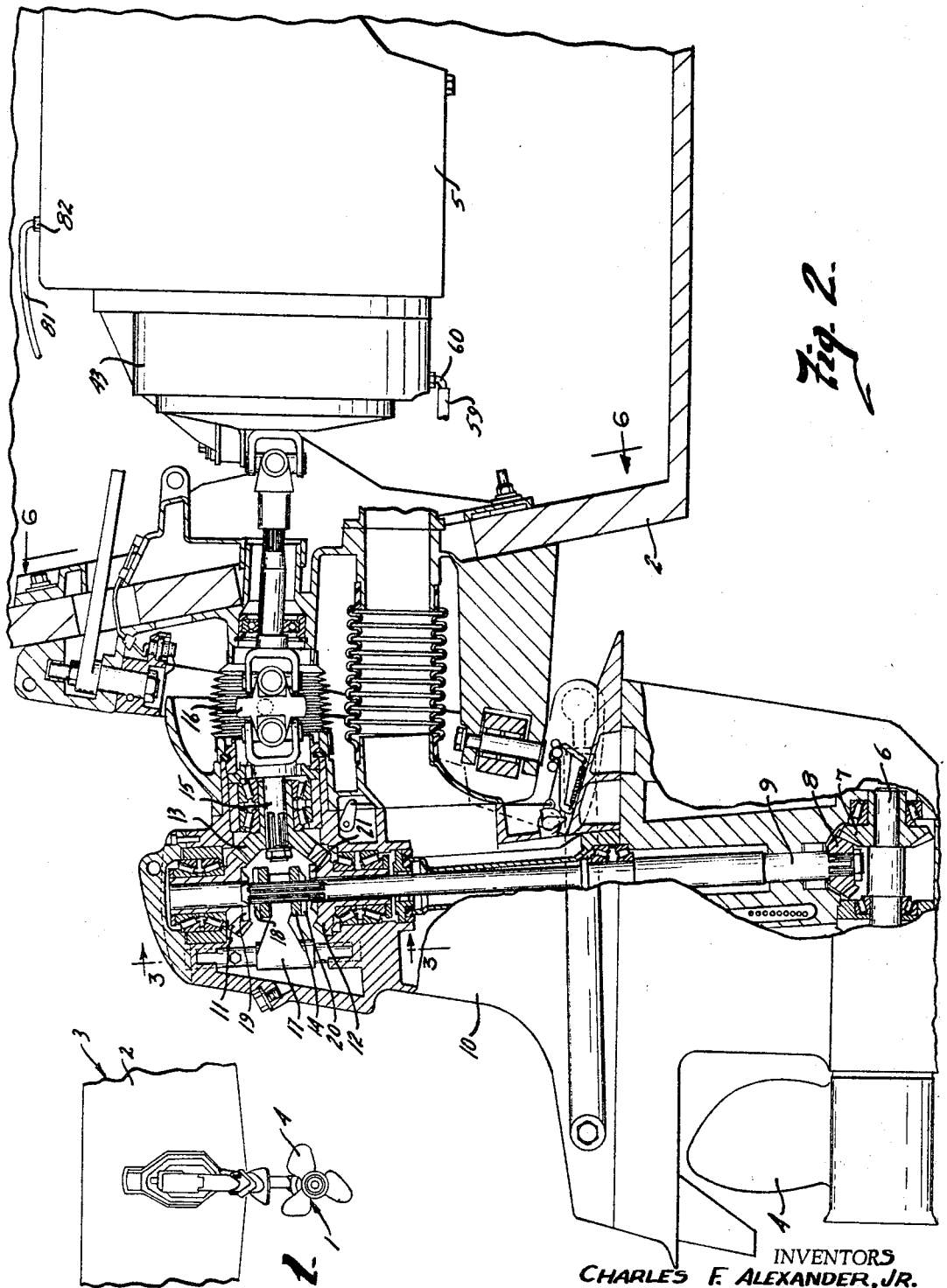

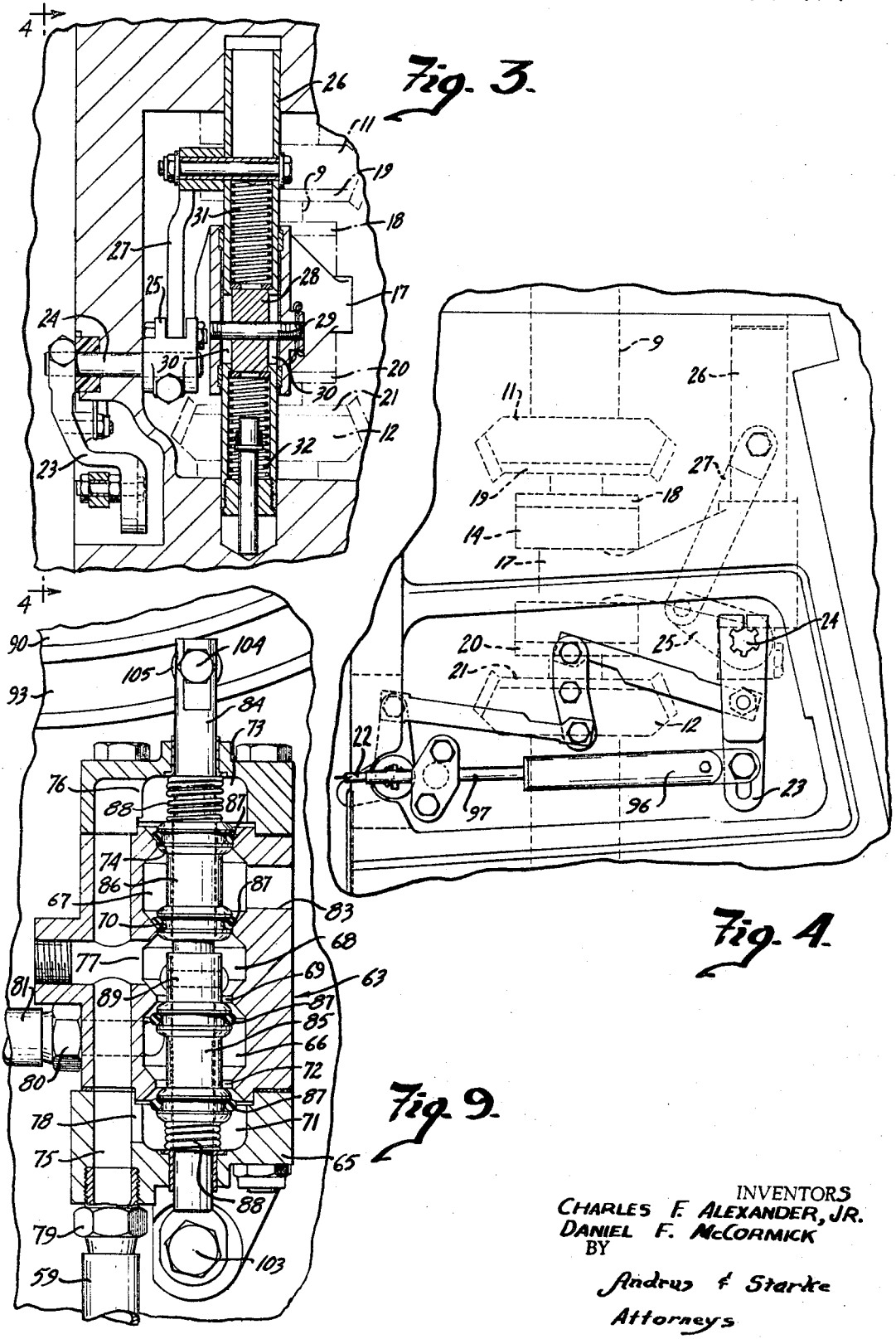

INVENTORS.
CHARLES F. ALEXANDER, JR.
DANIEL F. McCORMICK
BY
*Andrus & Starke*
*Attorneys*

United States Patent Office 3,399,647
Patented Sept. 3, 1968

3,399,647
ACTUATING MEANS FOR MARINE CLUTCH
Charles F. Alexander, Jr., and Daniel F. McCormick, Oshkosh, Wis., assignors, by mesne assignments, to Brunswick Corporation, Chicago, Ill., a corporation of Delaware
Continuation of application Ser. No. 336,254, Jan. 7, 1964. This application Oct. 21, 1966, Ser. No. 588,623
8 Claims. (Cl. 115—34)

ABSTRACT OF THE DISCLOSURE

The drive train of an engine driven marine propulsion unit includes shiftable means to selectively render the propeller inoperative. Variable friction clutch means are interposed in the drive train between the shiftable means and the engine and is constantly engaged with an engine driven member. The friction clutch means is operable to drive the propeller when the shiftable means have rendered the propeller operative and is otherwise adapted to impose a relatively small input torque to the drive train. Operation of the shiftable means and the friction clutch means are synchronized to provide for shifting of the shiftable means only when a relatively small input torque is imposed on the drive train.

This application is a continuation of Ser. No. 336,254, filed Jan. 7, 1964, now abandoned.

This invention relates to the actuating means for a marine clutch as may be employed in a stern drive unit.

In the reversing gear means for marine drive installations, a clutch element is commonly keyed on a drive or driven shaft intermediate spaced forward and reverse gears which are freely rotatable on the shaft. The clutch element is axially slidable on the shaft to selectively engage the gears and impart rotation of the corresponding gear to the driven shaft and thereby drive a propeller operatively connected to the driven shaft. Intermediate the spaced gears, the clutch element has a neutral position wherein the driven shaft and propeller remain inoperative.

When such reversing gear means are employed in marine drive installations wherein the inboard engine may be capable of delivering several hundred horsepower, considerable force is required to shift the clutch element into and out of engagement with the gears and gear engagement is effected with considerable noise and imposes a considerable stress on the drive components. It is generally an object of this invention to provide means whereby the noise and stress generally encountered with clutch engagement in marine drives and the force required to shift the clutch element are substantially reduced.

Generally according to this invention, clutch means are employed in marine drives and which are synchronized with the operation of the reversing gear means to disengage the drive or power flow before the sliding clutch element of the gear means is actuated. In this manner, shifting of the sliding clutch element of the reversing gear means is accomplished with ease inasmuch as substantially no torque is being transmitted to the propeller during this period.

More specifically the marine drive of this invention contemplates an inboard engine and drive unit having reversing gear means including a sliding clutch element selectively movable to forward, neutral and reverse drive positions. The clutch element is shifted by means of a remote control unit which is mounted conveniently for the operator within the boat. A throw-out or friction clutch is mounted on the engine flywheel and the input shaft to the drive unit is splined to the clutch plate. The friction clutch is normally engaged by a spring assembly to drive the drive unit. Disengagement of the friction clutch and drive is effected by a piston assembly which includes movable means which relieves the clutch spring to disengage the clutch. Operation of the friction clutch is controlled by the remote control unit for the sliding clutch element and is synchronized to provide for disengagement of the friction clutch to substantially remove the driving torque from the input shaft to the drive unit before shifting of the slidable clutch element takes place. After shifting of the sliding clutch element into forward or reverse drive, the friction clutch is reengaged by its spring assembly to again transmit engine torque and thereby propel the drive unit in accordance with sliding clutch engagement.

The drawings furnished herewith illustrate the best mode for carrying out the invention as presently contemplated and set forth hereinafter.

In the drawings:

FIGURE 1 is a perspective view of the outboard or stern drive unit of an inboard-outboard drive shown mounted on the transom of a boat;

FIG. 2 is an enlarged partial side elevation of an inboard-outboard drive with parts broken away and sectioned to show the drive arrangement with the reversing gear means;

FIG. 3 is an enlarged sectional view taken generally on line 3—3 of FIG. 2 and shows details of the reversing gear shift means;

FIG. 4 is an elevational view taken generally on line 4—4 of FIG. 3;

FIG. 9 is an enlarged sectional view of the valve means controlling the friction clutch actuator means.

Figure 6:
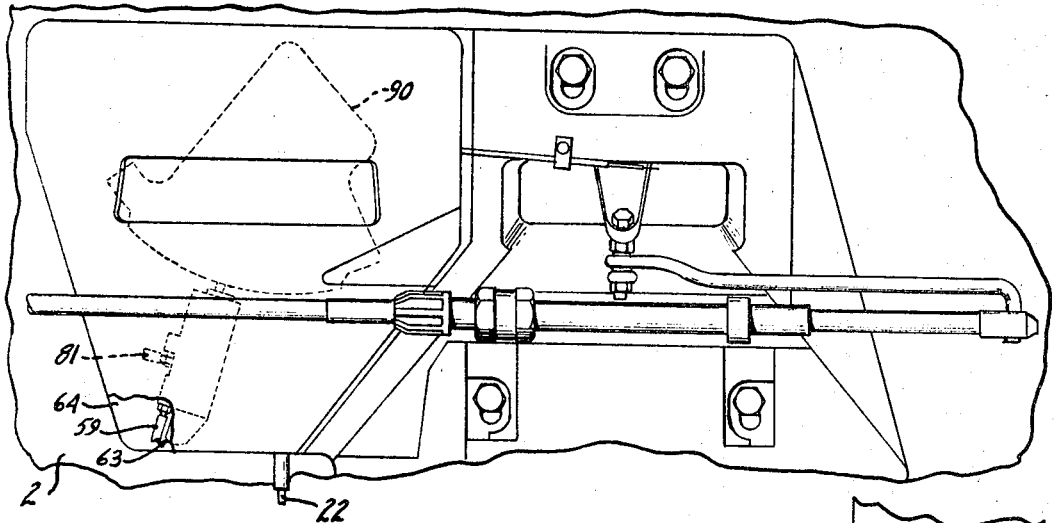
FIG. 6 is an enlarged view taken generally on the line 6—6 of FIG. 2 and shows the mounting of the synchronizing means for the friction clutch and reversing gear shift means.

Referring to the drawings, the inboard-outboard drive includes a stern drive unit 1 which is pendantly and dirigibly suspended outboard from the transom 2 of a partially shown boat or other watercraft 3. The drive unit includes a propeller 4 which is driven by the partially shown engine 5 mounted inboard of the boat.

The propeller 4 in the illustrated embodiment is a right-hand propeller providing forward propulsion with rotation to the right and is carried by the generally horizontal propeller shaft 6 which is driven through gears 7 and 8 by the generally vertical shaft 9 rotatably supported within housing 10 of the drive unit. A pair of vertically spaced beveled reversing gears 11 and 12, of which the upper gear 11 is the forward gear and the other the reverse gear, are mounted in suitable bearings and are freely rotatable on the upper end of shaft 9. The drive gear 13, the axis of which is disposed generally horizontal, drivingly engages the beveled gears 11 and 12 and causes the latter gears to rotate in opposed directions. A clutch element 14 disposed between gears 11 and 12 is carried by shaft 9 and is slidable axially of the shaft to selectively engage gears 11 and 12 to complete the drive connection between the drive gear 13 and the vertical shaft 9. Clutch element 14 also has an intermediate neutral position between gears 11 and 12 in which position of the clutch element the shaft 9 and propeller 4 are inoperative.

The drive gear 13 is driven by engine 5 through the generally horizontal drive shaft 15 which is interrupted by the double universal joint 16. Universal joint 16 is disposed generally with the center thereof at the intersection of the generally transverse vertical and horizontal planes respectively containing the swivel and tilt axes of the propulsion unit 1 so that the drive through joint 16 will remain intact during steering and tilt movements of the propulsion unit.

Clutch element 14 is selectively actuated or shifted into gear engagement by the shifter fork 17 movable generally vertically within housing 10. For forward drive operation the shifter fork 17 carries the clutch element 14 upwardly so that the circumferentially spaced ratchet teeth 18 on the clutch element engage with complementary ratchet teeth 19 on gear 11 to drive the propeller 4. Reverse drive operation is effected when the shifter fork 17 moves clutch element 14 downwardly to engage the circumferentially spaced ratchet teeth 20 on the clutch element with the complementary ratchet teeth 21 on the gear 12.

Movement of the clutch element 14 and shifter fork 17 is effected through actuating means including the push-pull cable 22 which is operated in a manner to be described hereinafter from a remote location in the watercraft. Cable 22 enters the propulsion unit housing 10 beneath the horizontal drive shaft 15 and is adapted to selectively actuate the shift lever 23 into positions corresponding to forward, neutral and reverse to pivot the shaft 24 correspondingly. The shaft 24 carries the arm 25 which in turn is connected to the tubular carrier 26 for the shifter fork 17 through the link 27 pivotally connected at one end to the arm and at the other end to the carrier. Thus, as lever 23 is actuated by cable 22 the carrier 26 and fork 17 are moved correspondingly to place clutch element 14 into the desired drive position.

When the clutch element 14 is moved to engage either of the gears 11 and 12, the corresponding ratchet teeth may initially crest each other rather than move directly into proper drive engagement. For this reason the fork 17 is yieldingly carried by the carrier 26. As generally shown in FIG. 3, the fork 17 is fixed to the follower slide 28 within carrier 26 by means of the pin member 29 which extends through opposed elongated slots 30 in the carrier. Normally the follower slide 28 is supported between opposed balanced springs 31 and 32 to maintain the pin member 29 in a position generally intermediate the length of the slots 30. If the movement of clutch element 14 is interrupted by initial cresting of corresponding ratchet teeth, the carrier 26 will continue to move to its shift position relative to the follower slide 28 and thereby will establish a differential pressure on the slide between the springs 31 and 32 tending to engage the crested teeth. After the corresponding teeth are properly aligned, engagement therebetween is effected by the differential spring pressure. The yielding fork construction is also useful in forward drive and permits ratchetting between the clutch element 14 and forward gear 11 when the engine 5 is suddenly throttled down and the vertical shaft 9 overruns the horizontal shaft 15 permitting the propeller 4 to windmill and thus prevent or substantially lessen trail out of the propulsion unit relative to the boat transom.

According to this invention, means are interposed in the drive system between the engine 5 and the stern drive unit 1 to effect a disconnect in the drive therebetween prior to shifting the clutch element 14 into or out of gear so that shifting of element 14 as desired is accomplished when substantially no torque is being transmitted to the drive unit.

The means for effecting a disconnect between the engine 5 and the drive unit 1 includes a throw-out or friction clutch 33 mounted on the flywheel 34 carried on the engine shaft 35. The friction clutch assembly 33 includes the driven disc 36 which is interposed between the flywheel 34 and a pressure plate 37. The driven disc 36 is carried by the input shaft 38 which is rotatably supported in longitudinally spaced and aligned bearings 39 and 40, respectively, disposed in a cylindrical bore 41 in engine shaft 35 and in the bore opening 42 provided in the generally cylindrical housing 43 enclosing the flywheel 34 and clutch assembly 33. The pressure plate 37 is normally biased into the forward engaged position clamping the driven disc 36 to the flywheel 34 to connect the flywheel and input shaft 38 by the outer portion of the annular Belleville diaphragm spring 44 which is secured to the cover 45 by a plurality of circumferentially spaced pin means 46.

To disconnect the input shaft 38 from the flywheel 34, the inner portion of spring 44 is engaged by the forward thrust member 47 of the slidable annular sleeve 48 to deflect the portion of the spring outwardly of pin means 46 rearwardly and thereby relieve the pressure plate 37. After pressure plate 37 is relieved from the normal bias of spring 44, a plurality of circumferentially spaced bar retraction springs 49 connecting the pressure plate 37 and cover 45 draw the pressure plate rearwardly and unclamp the driven disc 36. When the slidable sleeve 48 is withdrawn rearwardly, the diaphragm spring 44 returns to its normal position biasing the pressure plate 37 forwardly against the force of the retraction springs 49 to reclamp the driven disc 36 to the flywheel 34 to thereby reengage the flywheel and input shaft 38.

The input shaft 38 extends rearwardly to the outside of flywheel housing 43 and is joined to the drive shaft 15 for the drive unit 1 by the universal coupling 50 so that the input shaft may be considered to be an extension of the drive shaft.

The thrust member 47 for engaging the clutch spring 44 is slidable on the input shaft 38 and a throw-out bearing 51 is seated between the thrust member and its sleeve 48 providing for relative rotation therebetween. The thrust sleeve 48 is slidable on the fixed longitudinal guide sleeve 52 supported by the flywheel housing 43 and is actuated by the relatively large annular piston 53 to which the sleeve is integrally connected. The piston 53 is sealingly connected to the inner wall of housing 43 by means of the annular flexible diaphragm member 54 and is movable in response to a pressure differential within the piston chamber 55 formed between the annular inner partition plate 56 and the rear wall of the flywheel housing. The thrust sleeve 48 projects forwardly through the central opening 57 in plate 56 and a suitable sliding seal 58 is interposed between the partition plate and the movable sleeve.

Forwardly of piston 53, chamber 55 communicates with a source of vacuum through the conduit 59 connected to the fitting 60 to the chamber. One or more vent openings 61 places the portion of chamber 55 rearwardly of piston 53 in communication with the atmosphere.

In operation and to effect disengagement of the friction clutch 33, a vacuum is drawn in chamber 55 ahead of piston 53. Thereupon atmospheric pressure rearwardly of piston 53 forces the piston forwardly within the chamber to move the thrust member 47 into engagement with the clutch spring 44 to effect clutch disengagement and thereby interrupt the drive connection between engine 5 and the input shaft 38. The friction clutch 33 is returned to its normal engaged position when atmospheric pressure is reintroduced in chamber 55 ahead of piston 53 and the piston is forced rearwardly in the chamber and held there by the plurality of springs 62 interposed between the piston and partition wall 56.

The operation of the friction clutch assembly 33 is controlled by the valve 63 mounted on cam plate 64 carried on the transom 2 of the watercraft. The valve 63 includes a body 65 having a vacuum chamber 66 and an atmospheric pressure chamber 67. An intermediate chamber 68 is disposed between the chambers 66 and 67 and is separated from the respective chambers by the inwardly projecting seats 69 and 70. The valve body 65 further includes the end chamber 71 separated from the vacuum chamber 66 by the inwardly projecting seat 72 and the end chamber 73 separated from the atmospheric chamber 67 by the similar valve seat 74. A longitudinal passage 75 extends the length of the valve body 65 and communicates with the end chamber 73 through passage 76, the intermediate chamber 68 through passage 77 and the other end chamber 71 through passage 78. A suitable fitting 79 is secured in the valve body 65 in communication with passage 75 and receives the other end of conduit 59 connecting the passage to the piston chamber 55 in flywheel housing 43. A second fitting 80 is secured in the valve body 65 in communication with vacuum chamber 66 and a conduit 81 connects the fitting 80 to a source of vacuum which in the illustrated embodiment is the engine fitting 82 communicating with the intake manifold of engine 5. An opening 83 in the valve body 65 admits atmospheric pressure to the chamber 67.

A valve stem 84 is supported for reciprocal movement in the valve body 65 and freely carries a pair of spaced spool valve members 85 and 86 the flange portions of which are fitted with O-ring seals 87. The valve member 85 is adapted to span the distance between the valve seats 72 and 69 placing the seals 87 into engagement with the seats to thus close the vacuum chamber 66 from communication with passage 75. The valve member 86 is adapted to span the distance between the valve seats 74 and 70 and with the seals 87 thereof engaging with the seats to close the atmospheric chamber 67 from communication with passage 75. A compression spring 88 disposed around the valve stem 84 in the respective end chambers 71 and 73 biases the respective valve members 85 and 86 to the closed position. An actuating collar 89 is secured on the valve stem 84 intermediate the valve members 85 and 86 and is adapted with selective movement of the stem to unseat the valve members against the force of the corresponding spring 88 to open the respective valve chambers.

In operation, when the valve stem 84 is moved so that collar 89 engages and unseats valve member 85, the vacuum chamber 66 is placed in communication with passage 75 through passages 77 and 78, chambers 68 and 71 past the valve seats 69 and 72, with the valve member being subjected to a balanced pressure. As a result a vacuum is drawn in the piston chamber 55 ahead of piston 53 from the intake manifold of engine 5 through the conduits 59 and 81 and valve 63 so that a resultant pressure differential acts on the piston to disengage the friction clutch 33 to thereby interrupt the power flow from engine 5 to the stern drive unit 1. If the sliding clutch 14 is now selectively shifted, the shift is accomplished at a time when no torque is being transmitted to the drive unit. With movement of the valve stem 84 in the opposite direction, the corresponding spring 88 reseats the valve member 85 to interrupt the vacuum line between the chamber 55 and engine 5.

When the valve stem 84 is moved so that collar 89 unseats valve member 86, the chamber 67 which is open to the atmosphere is placed in communication with passage 75 through passages 76 and 77, chambers 73 and 68 past the valve seats 74 and 70 with the valve member being subjected to a balanced pressure. As a result atmospheric pressure is conducted through conduit 59 to chamber 55 ahead of piston 53 so that the friction clutch 33 can resume its normally engaged position as piston 53 is subjected to balanced pressure and is returned and held in its rearmost position by the springs 62. With reengagement of the friction clutch 33, the power flow to the drive unit 1 is restored and the watercraft is propelled in accordance with gear engagement by the sliding clutch 14 in the drive unit.

Because it is desired to shift clutch element 14 into and out of engagement with gears 11 and 12 selectively only during periods when power flow from the engine 5 to the drive unit 1 is interrupted, it becomes necessary to synchronize the operation of sliding clutch 14 and friction clutch 33. The desired synchronization is attained through employment of the shift cam 90 which is pivotally mounted on the transom cam plate 64 at 91. The cam 90 is provided with a pair of spaced cam recesses 92 and 93 for controlling the sliding clutch 14 and friction clutch 33 respectively.

A cam follower roller 94 is rotatably mounted on the lower end of stud 95 and is disposed in the cam recess 92 for controlling the sliding clutch 14. The stud 95 pivotally mounts the free end of the tubular cable guide 96 which is secured to the end of the core wire of cable 22 and a rigid cable casing extension member 97 is pivotally anchored at 98 on the cam plate 64 and is telescopingly received by the tubular guide. With actuation of cam 90, the stud 95 moves generally radially of the cam in a slight arcuate path as confined by the stabilizer rod 99 pivotally mounted on the cam plate 64 at 100 and extending generally normal to cable 22 in the neutral position of the stud.

Actuation of cable 22 to operate the shift lever 23 in the drive unit 1 is effected by the curvature of cam recess 92 which is non-circumferential with respect to the cam pivot 91 through the forward and reverse shift ranges. The respective ends of cam recess 92 does, however, include portions beyond the shift ranges and outwardly from the dot-dash lines 101 and 102 which are circumferential with respect to the cam pivot at 91 so as to permit some cam over travel without further actuation of cable 22. Rotation of the cam 90 in a clockwise direction from its neutral position through the forward shift range exerts a pull on the core wire of cable 22 and moves the shift lever 23 in the drive unit 1 correspondingly to engage clutch element 14 with the forward gear 11. Counterclockwise rotation of cam 90 from its neutral position through the reverse shift range pushes the cable core wire relative to the casing and moves the shift lever 23 correspondingly to engage the clutch element 14 with the reverse gear 12.

The valve 63 is mounted on the cam plate 64 outwardly from and adjacent to cam 90. The valve 63 and its stem 84 are disposed generally radially with respect to the cam pivot at 91 and the end of the valve farthest removed from the cam is pivotally mounted on the plate 64 at 103. A stud 104 pivotally mounts the end of the valve stem 84 which projects from the valve over the cam recess 93 for controlling the friction clutch 33. A cam follower roller 105 is rotatably mounted on the lower end of stud 104 and is disposed in the cam recess 93. Stud 104 also pivotally mounts the stabilizer rod 106 which is pivotally mounted on the cam plate 64 at 107 and extends generally normal to the valve 63 when the stud is in the clutch disengaged position.

Cam recess 93 includes a central clutch disengaged portion which is circumferential with respect to the cam pivot at 91 and extends through an angle at least equalling that required for the combined forward and reverse shift ranges of cam recess 92. At the respective ends of the central clutch disengaged portion of recess 93, the recess jogs inwardly to a lesser radius and terminates with relatively short circumferential clutch engaged portions at the lesser radius.

When the stud 104 and roller 105 are confined in the central elongated portion of recess 93, the valve stem 84 of valve 63 is positioned to unseat the valve member 85 so that a vacuum is drawn ahead of piston 53 in chamber 55 of the engine flywheel housing 43, and the friction clutch 33 is disengaged. Since the central elongated portion of recess 93 extends through an angle at least equalling that required for the combined forward and reverse shift ranges of cam recess 92, the friction clutch 33 will remain disengaged with selective rotation of cam 90 through the forward and reverse shift ranges so that the sliding clutch element 14 is correspondingly engaged at a time when the power flow to the stern drive unit 1 is interrupted. After the clutch element 14 is selectively engaged and the cam 90 proceeds to over travel the corresponding shift range of recess 92, the stud 104 and roller 105 move from the central portion into the corresponding end portion of recess 93 whereupon the valve stem 84 is actuated to permit closure of valve member 85 interrupting the vacuum line and to unseat the valve member 86. With the unseating of valve member 86, the piston 53 in chamber 55 moves rearwardly and the friction clutch 33 resumes its normally engaged position to restore the power flow to the stern drive unit 1 to drive the watercraft in the direction corresponding to gear engagement by clutch element 14 in accordance with throttle demands.

When it is desired to disengage the sliding clutch element 14 from the selected reversing gears 11 and 12 and the cam 90 is rotated accordingly, the stud 104 and roller 105 initially move from the corresponding end portion of recess 93 into the elongated central portion whereupon the valve stem 84 is actuated to permit closure of valve member 86 and to again unseat the valve member 85. With the unseating of valve member 85, a vacuum is again drawn ahead of piston 53 in chamber 55 to disengage the friction clutch 33 and interrupt the power flow from the engine 5 to the stern drive unit 1. After the vacuum line is reestablished to disengage friction clutch 33, the stud 95 and roller 94 move from the over-travel portion of recess 92 and through the corresponding shift range to the neutral position to effect a disengagement of the sliding clutch element 14 from the corresponding reversing gear and to return the clutch element 14 to its neutral position. Thus, the cam 90 provides that shifting of clutch element 14 into engagement and out of engagement with the selected reversing gear 11 and 12 will only be effected when the friction clutch 33 is disengaged and power flow from the engine 5 to the drive unit 1 is interrupted.

The rotation of cam 90 to selectively shift clutch element 14 into and out of engagement with the selected reversing gears 11 and 12 is effected by operation of the remote control unit 108 mounted in the watercraft 3 at a location convenient to the operator. The control unit 108 is connected to cam 90 by push-pull cable 109 which at the cam end is provided with a tubular guide member 110 secured to the cable core wire and a rigid cable casing extension 111 which telescopes into the guide member with operation of the control.

For a port mounted control unit 108, the free end of the guide member 110 is pivotally connected to the cam 90 at 112 generally on a line through the cam pivot 91 and the stud 95 mounting the end of cable 22. The casing extension 111 of cable 109 is pivotally mounted on cam plate 64 at 113 placing the actuating end of cable 109 generally normal to the cam end of cable 22. Clockwise rotation of cam 90 for forward drive operation of the drive unit 1 is attained by moving the core wire of cable 109 rearwardly with respect to control 108 by forward movement of control lever 114 from the upright neutral position to extend the guide member 110 relative to the casing extension 111. Movement of the control lever 114 rearwardly from its neutral position effects counterclockwise rotation of cam 90 as the core wire is moved forwardly relative to the control unit to contract the guide member 110 relative to the casing extension 111.

Figure 7:
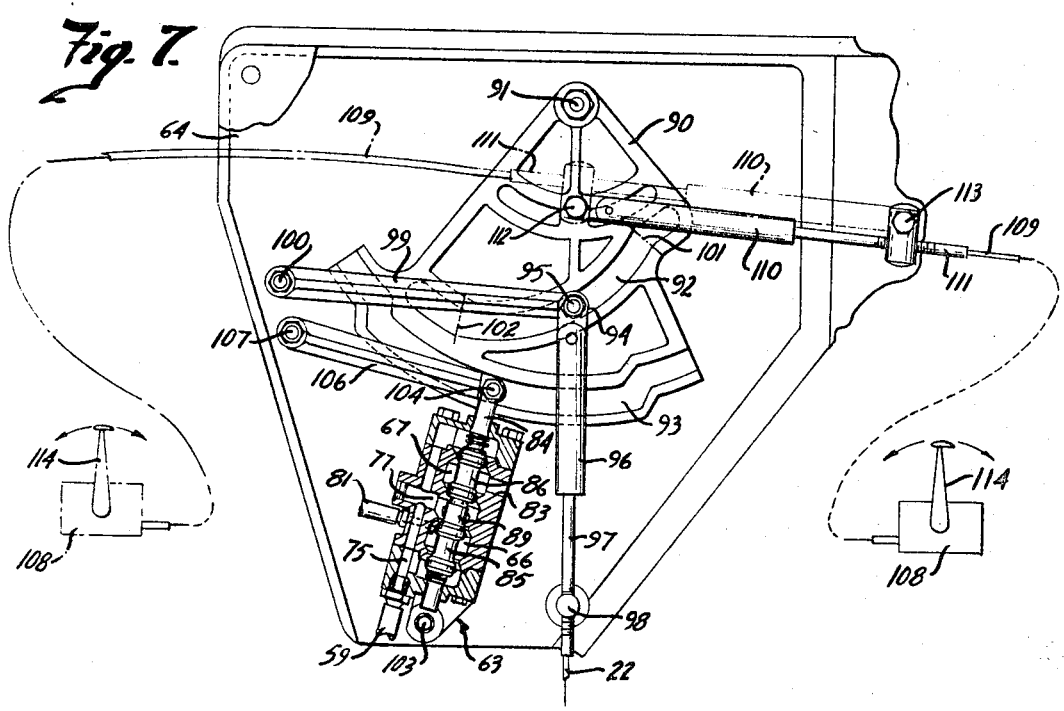
FIG. 7 is a plan view partially in section showing the synchronizing means for the friction clutch and reversing gear with cover removed and in the neutral position and further shows the actuating means for the synchronizing means adapted for mounting on the port side of the watercraft and in phantom shows the actuating means adapted for mounting on the starboard side of the watercraft.
Figure 8:
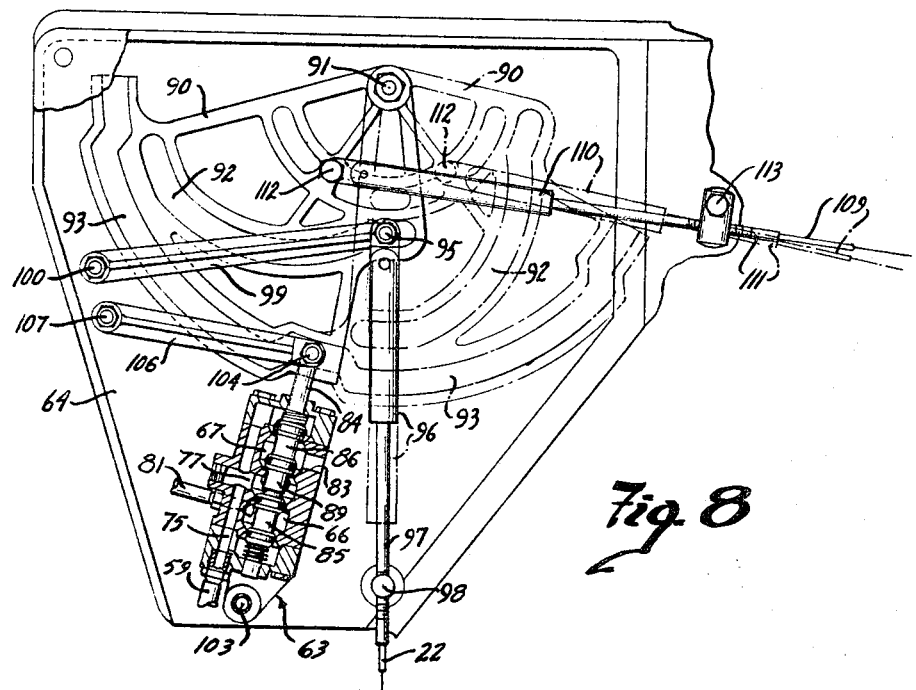
FIG. 8 is a view similar to FIG. 7 and shows the synchronizing means in forward drive position and in phantom shows the synchronizing means in the reverse drive position.

For a starboard mounted control unit 108 the pivotal mounting of guide member 110 and casing extension 111 are reversed from the port mounted control unit so that the free end of the guide member is disposed at 113 fixing the end of the core wire of cable 109 and the casing extension is pivoted to cam 90 at 112 as generally shown in phantom in FIG. 7. Now clockwise rotation of cam 90 and forward drive operation of the drive unit 1 are attained by moving the control lever 114 forwardly to introduce more slack into the cable 109 between the control unit 108 and the cam plate 64 and thereby effect outward movement of the casing extension 111 relative to the guide member 110. Movement of control lever 114 rearwardly removes slack from cable 109 between the control 108 and the cam plate 64 causing the casing extension 111 to telescope into the guide member 110 to thereby move cam 90 in a counterclockwise direction for reverse drive operation of drive unit 1. Thus, at the pleasure of the operator the control unit 108 may be mounted on either side of the watercraft.

Figure 5:
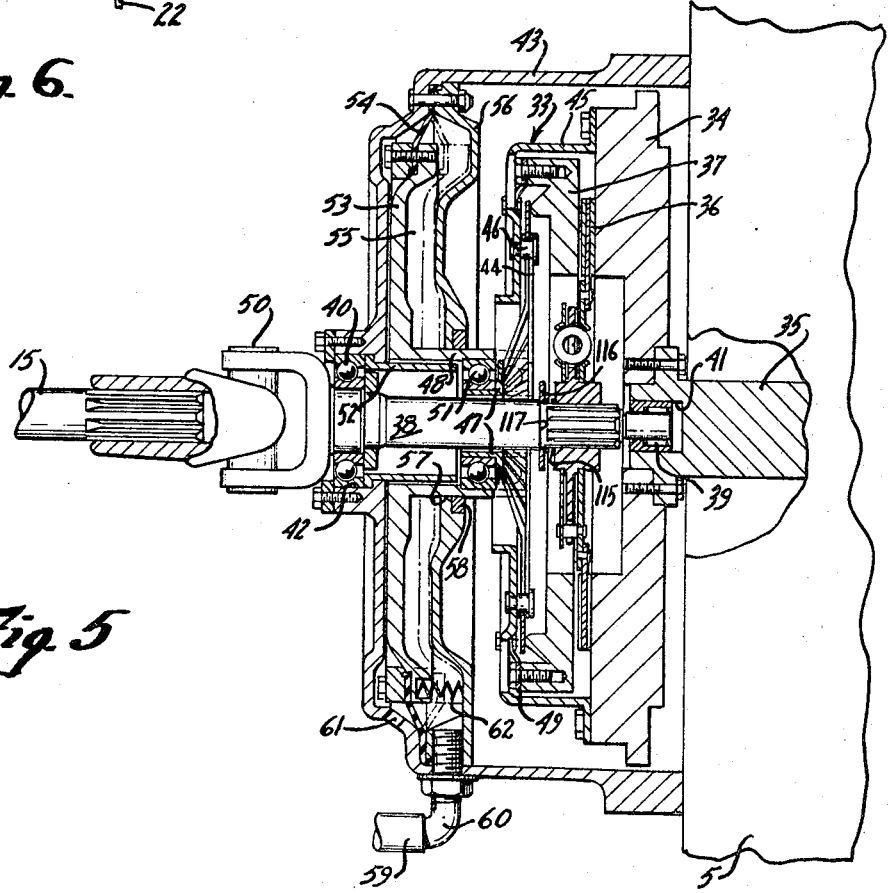
FIG. 5 is an enlarged sectional view showing the friction clutch and actuator means therefor in the clutch engaged position and in phantom showing the neutral or clutch disengaged position.

As hereinbefore indicated, when the clutch element 14 is moved to engage either of the gears 11 and 12, the corresponding teeth may initially crest each other and await friction clutch engagement before moving into proper mesh. More timely engagement of clutch element 14 is obtainable, if desired, by subjecting shaft 15 to a relatively small input torque when the piston 53 is moved to the clutch disengaged position shown in phantom in FIG. 5. To provide a slight input torque on shaft 15 when piston 53 is in the clutch disengaged position, the relatively small spring 115 may be disposed on shaft 38 between the washer 116 seated against the shaft shoulder 117 and the clutch disc 36 to bear against the disc and maintain a partial or slipping engagement between the disc and engine flywheel 34. The amount of torque to be transmitted to the drive by the partial engagement of disc 36 and flywheel 34 when employing spring 115 should be adequate to provide for relative movement between the cresting teeth so that the differential pressure between springs 31 and 32 in the fork carrier 26 can be effective to properly engage the sliding clutch element 14 prior to full engagement of the friction clutch 33.

Where it is desired to shift clutch element 14 with no torque being transmitted to shaft 15, the spring 115 is eliminated and the initially cresting teeth between the clutch element and either of the gears 11 and 12 are properly engaged after the friction clutch 33 is fully engaged.

The invention herein described provides for shifting of the reversing gear means in a marine propulsion unit after the power flow from the engine to the drive unit is interrupted. Since the shifting of gears is effected at a time when substantially no torque is being transmitted, it is accomplished with relative ease, a minimum of noise and with a minimum of stress on the drive unit components.

Various modes of carrying out the invention are contemplated as being within the scope of the following claims particularly pointing out and distinctly claiming the subject matter which is regarded as the invention.

We claim:

1. In an inboard-outboard drive for watercraft and including an inboard engine and an outboard propulsion unit having a propeller, drive means between the engine and propeller and including generally horizontal and vertical shafts connected by reversing gear means shiftable to provide for propeller rotation in opposite directions to selectively drive the watercraft in a given direction, a friction clutch including a clutch disc connecting the engine to the horizontal shaft and having a normally engaged position wherein the propeller is driven by the drive means, an annular chamber disposed around the horizontal shaft and adjacent to the friction clutch, annular piston means disposed in the chamber and being movable axially of the shaft between a clutch engaged position and a clutch disengaged position, said piston means including means projecting from the chamber and engageable with the clutch to effect substantial disengagement of said clutch disc from the engine with movement of the piston means to the clutch disengaged position, a source for drawing a vacuum, means connecting said source to said chamber ahead of the piston means, said chamber being vented to the atmosphere behind the piston means to establish a pressure differential across the piston means upon evacuation of the chamber ahead of the piston means to move the latter to the clutch disengaged position, spring means urging the clutch disc into partial engagement with the engine when the piston means are moved to the clutch disengaged position, and means for synchronizing the shifting of the reversing gear means with the means to effect friction clutch disengagement to provide for shifting of said reversing gear means when the drive means are subjected to a relatively small torque input.

2. The invention as set forth in claim 1 wherein the engine provides the source for drawing the vacuum.

3. The invention as set forth in claim 1 wherein a valve is interposed in the means connecting the source for drawing a vacuum and the chamber and said valve is operable to alternately evacuate and vent the chamber ahead of the piston means, and wherein the synchronizing means actuates the valve, said synchronizing means providing for evacuation of the chamber ahead of the piston means to disengage the clutch prior to shifting of the reversing gear means and venting of said chamber after engagement of the reversing gear means to reengage the clutch and thereby drive the watercraft.

4. The invention as set forth in claim 1 wherein a valve is interposed in the means connecting the source for drawing a vacuum and the chamber and said valve is operable to alternately evacuate and vent the chamber ahead of the piston means, and wherein the synchronizing means comprises a cam, said cam being operatively connected to the reversing gear means and to the valve, and means to actuate the cam to provide for evacuation of the chamber ahead of the piston means to disengage the clutch prior to shifting of the reversing gear means and for venting of said chamber after engagement of the reversing gear means to reengage the clutch and thereby drive the watercraft.

5. The invention as set forth in claim 4 wherein the synchronizing cam is selectively pivotable about a given axis and includes a first recess having an intermediate portion which is non-circumferential with respect to the cam axis and extends through an angle corresponding to the combined shift ranges of the reversing gear means to effect shifting of the latter, said first recess including circumferential terminal portions providing for cam over travel beyond the respective shift ranges of the reversing gear means, and a second recess having a circumferential intermediate portion which extends through an angle at least as large as the angle of the intermediate portion of the first recess and is effective simultaneously as the intermediate portion of the first recess to actuate and maintain the valve in position for clutch disengagement and thereby provide for selective shifting of the reversing gear means when a relatively small torque input is being transmitted to the drive means, said second recess including circumferential terminal portions offset radially in a given direction from the intermediate portion and corresponding generally to the cam over travel portions of the first recess and being effective to actuate the valve and thereby provide for clutch reengagement after selective engagement of the reversing gear means to drive the watercraft.

6. In a marine drive for watercraft having an engine and a propeller, drive means operatively connecting the engine to the propeller and including reversing gear means shiftable to provide for propeller rotation selectively in opposite directions, a friction clutch including a clutch disc in the drive means between the engine and the reversing gear means, said clutch disc being engageable with an engine driven member and having a normally engaged position wherein the drive means are rendered capable of driving the propeller when the reversing gear means are engaged, piston means associated with the drive means adjacent to said friction clutch and being movable in response to a fluid pressure differential across the piston means to effect substantial disengagement of said clutch disc from the engine driven member, means including valve means to provide for establishment of a pressure differential across the piston means to move the latter to the clutch disengagement position, means urging the clutch disc into partial engagement with the engine driven member when the piston means are moved to the clutch disengagement position, movable cam means for synchronizing operation of the valve means with shifting of the reversing gear means, said cam means providing for establishment of a pressure differential across the piston means to move the latter to the clutch disengagement position to effect substantial disengagement of the clutch disc prior to shifting of said reversing gear means so that the latter are shiftable when a relatively small torque input is being transmitted to the drive means, and means to move the cam means to shift the reversing gear means.

7. In an engine driven marine drive unit having a propeller, drive means operatively connecting the engine to the propeller and including reversing gear means shiftable to provide for propeller rotation selectively in opposite directions, a friction clutch including a clutch disc in the drive means between the engine and the reversing gear means, said clutch disc being engageable with an engine driven member and having a normally engaged position wherein the drive means are rendered capable of driving the propeller when the reversing gear means are engaged, piston means associated with the drive means adjacent to said friction clutch and being movable to effect substantial disengagement of said clutch disc from the engine driven member, a source for drawing a vacuum communicating with the piston means to establish a pressure differential across the piston means to thereby move the piston means to the clutch disengagement position, valve means between the source for drawing a vacuum and the piston means and being operable to control movement of the piston means, means urging the clutch disc into partial engagement with the engine driven member when the piston means are moved to the clutch disengagement position, movable cam means for synchronizing operation of the valve means with shifting of the reversing gear means, said cam means providing for establishment of a pressure differential across the piston means to move the latter to the clutch disengagement position to effect substantial disengagement of the clutch disc prior to shifting of said reversing gear means so that the latter are shiftable when a relatively small torque input is being transmitted to the drive means, and means to move the cam means to shift the reversing gear means.

8. In an engine driven marine propulsion unit having a propeller, drive means between the engine and propeller including positive tooth type shiftable means to selectively render the propeller inoperative or operative, variable friction clutch means in the drive means between the engine and shiftable means, said clutch means being constantly engaged and having two positions in one of which a small torque is transmitted from the engine to the input side of said shiftable means and in the other of which a full driving torque is transmitted from the engine to said shiftable means, and means to synchronize operation of the shiftable means and the friction clutch means to provide for shifting of the shiftable means only when said friction clutch means is transmitting a relatively small input torque to said shiftable means.

References Cited
UNITED STATES PATENTS

| | | | |
|---|---|---|---|
| 1,667,842 | 5/1928 | Coykendall | 115—34 |
| 1,778,970 | 10/1930 | Cotta et al. | 192—3.5 |
| 2,057,744 | 10/1936 | Sanford | 192—91 |
| 2,630,897 | 3/1953 | Porter | 192—89 |
| 3,136,284 | 6/1964 | North | 115—35 |

MILTON BUCHLER, *Primary Examiner.*

T. MAJOR, *Assistant Examiner.*